United States Patent
Solodnik et al.

(10) Patent No.: US 11,128,598 B1
(45) Date of Patent: *Sep. 21, 2021

(54) METHODS AND SYSTEMS FOR DISCOVERING MEDIA ACCESS CONTROL (MAC) ADDRESSES

(71) Applicant: CYBERTOKA Ltd., Tel Aviv (IL)

(72) Inventors: Yuval Solodnik, Tel Aviv (IL); Baruch Weizman, Givatayim (IL)

(73) Assignee: CYBERTOKA Ltd., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/236,066

(22) Filed: Apr. 21, 2021

Related U.S. Application Data

(63) Continuation of application No. 17/146,544, filed on Jan. 12, 2021, now Pat. No. 11,063,899.

(51) Int. Cl.
*H04L 29/12* (2006.01)
*H04W 4/80* (2018.01)

(52) U.S. Cl.
CPC ...... *H04L 61/1541* (2013.01); *H04L 61/6022* (2013.01); *H04W 4/80* (2018.02)

(58) Field of Classification Search
CPC ... H04L 61/1541; H04L 61/6022; H04W 4/80
USPC ........................................................ 709/245
See application file for complete search history.

(56) References Cited

U.S. PATENT DOCUMENTS

| | | | |
|---|---|---|---|
| 7,505,751 B1* | 3/2009 | Backes | H04W 84/18 455/332 |
| 9,912,588 B2* | 3/2018 | Barrett | H04W 76/15 |
| 2008/0084866 A1* | 4/2008 | Johnson | H04L 45/66 370/351 |
| 2012/0023242 A1* | 1/2012 | Pirbhai | H04L 29/12839 709/228 |
| 2020/0220814 A1* | 7/2020 | Hazay | H04L 12/4641 |

OTHER PUBLICATIONS

MAC Address Randomization in not enough: An Analysis of Wi-Fi network Discovery Mechanisms. ASIA CCS' 16, May 30-Jun. 3, 2016, Xi'an, China. pp. 1-12 Mathy Vanhoef et al.*

RFC 7769—MAC Address Withdrawal over static pseudowire (pp. 1-11) S. Sivabalan et al. Feb. 2016.*

* cited by examiner

*Primary Examiner* — Tauqir Hussain
(74) *Attorney, Agent, or Firm* — Mark M. Friedman

(57) ABSTRACT

Computerized methods and systems determine LAP and UAP values of the MAC address of electronic devices. A memory stores LAP records. Each LAP record has at least: an LAP value associated with an electronic device, and candidate UAP values associated with the LAP value. A packet processor modifies the LAP records by updating the candidate UAP values based on information associated with packets received from electronic devices. A probing manager modifies each LAP record by updating each LAP record to include a determined UAP value selected from the candidate UAP values based on attempts to connect to an electronic device of the electronic devices using selected candidate LAP-UAP value pairs. Each pair has the LAP value of the LAP record and a selected one of the candidate UAP values that is selected based on one or more computed metrics associated with the candidate LAP-UAP value pairs.

21 Claims, 6 Drawing Sheets

METHODS AND SYSTEMS FOR DISCOVERING MEDIA ACCESS CONTROL (MAC) ADDRESSES

TECHNICAL FIELD

The present invention relates to methods and systems for determining parts of media access control (MAC) addresses of wireless devices that communicate in accordance with the Bluetooth® Basic Rate or Bluetooth® Enhanced Data Rate protocol.

BACKGROUND OF THE INVENTION

Bluetooth® is a well-known wireless technology standard for exchanging data between electronic devices over short distances. Bluetooth® (abbreviated and referred to hereinafter as BT) is widely adopted and supported by a wide range of electronic devices, such as, for example, mobile phones, desktop computers, laptop computers, printers, headsets, home and car entertainment systems, and medical devices.

The BT standard uses a master-slave architecture that supports the creation of a piconet in which one master device can communicate with several (typically up to seven) slave devices. The BT standard employs several security mechanisms in order to protect transmission of data so as to prevent eavesdropping and data modification by third parties.

One such (optional) mechanism is link layer encryption, where a significant portion of the data of BT packets is encrypted.

Another security mechanism employed by the BT standard is frequency hopping. With frequency hopping, BT devices send packets over a changing sequence of frequency channels. Frequency hopping (FH) is a well-known spread spectrum technique used in various communications technologies, and provides two main advantages when applied within the context of BT: 1) FH provides a layer of security because any would-be-attacker needs to either know the hopping sequence or monitor the entire set of possible frequency channels, and 2) FH mitigates the risk of interference between two or more disjoint piconets. The hopping sequence in a piconet is derived from the MAC address of the master and is further controlled by a master clock implemented as a 28-bit counter incremented at a rate of 3.2 kHz.

A third security mechanism employed by the BT standard is data whitening. With data whitening, the header and payload parts of the BT packet are whitened (i.e., scrambled) using a first Linear Feedback Shift Register (LFSR) whose output is used to bitwise exclusively OR (XOR) these parts of the BT packet. For each BT packet being whitened, the sender (i.e., transmitter) initializes the first LFSR with an initial value derived from the 6 least significant bits of the clock of the master (these 6-bits are denoted hereinafter as CLK1-6). Thus, to be able to transmit and receive BT packets, the sender and receiver normally need to know the master MAC address and be synchronized with its clock.

A BT device can be in "discoverable mode" or in "undiscoverable mode". A device which is in "undiscoverable mode" does not advertise its MAC address in response to inquiries thus making it difficult for other devices that do not know the MAC address of the undiscoverable device to be able to communicate with, or to eavesdrop on the communication of, the undiscoverable device.

SUMMARY OF THE INVENTION

The present invention is directed to computerized systems and methods for determining the MAC address of electronic devices that operate according to the BT standard. In particular, computerized systems and methods of the present invention enable the efficient determination of the relevant parts of the MAC address of BT master devices even when such BT master devices are undiscoverable and/or are in an idle state. Furthermore, the computerized systems and methods of the present invention allow this determination to be made in environments in which many BT devices are present, and in certain preferred embodiments the determination is prioritized according to certain characteristics of the device whose MAC address is to be determined.

Embodiments of the present invention are directed to a method for determining values of a lower address part (LAP) and an upper address part (UAP) of a media access control (MAC) address of one or more electronic devices. The method comprises: storing a plurality of LAP records in a memory, each of the LAP records including at least: i) an LAP value associated with an electronic device, and ii) one or more candidate UAP values associated with the LAP value; and modifying the LAP records by: i) updating the candidate UAP values in the LAP records based on information associated with packets received from one or more electronic devices, and ii) for each of one or more of the LAP records, updating the LAP record to include a determined UAP value selected from the candidate UAP values associated with the LAP value of the LAP record based on attempts to connect to an electronic device of the one or more electronic devices using selected candidate LAP-UAP value pairs, each pair having the LAP value of the LAP record and a selected one of the candidate UAP values associated with the selected LAP value, the selected candidate LAP-UAP pairs being selected based on one or more computed metrics associated with the candidate LAP-UAP value pairs.

Optionally, updating the LAP record to include a determined UAP value includes: retrieving one or more of the LAP records from the memory, computing for each retrieved LAP record: an LAP score associated with the LAP value in the LAP record, for each of the one or more candidate UAP values in the LAP record, a UAP score associated with the candidate UAP value, the candidate UAP value and the LAP value forming a candidate significant address part (SAP) value, and for each of the one or more candidate SAP values, an SAP score based on the LAP score and the UAP score, and attempting, by a probe device, to establish a connection to a selected electronic device of the one or more electronic devices using a selected one of candidate SAP values based on the SAP scores.

Optionally, the method further comprises: if the connection is successfully established, updating the LAP record having the LAP value of the selected SAP value to include the candidate UAP value of the selected SAP value as a determined UAP value associated with the LAP value.

Optionally, the method further comprises: by the probe device, interrogating the device to extract information associated with the selected electronic device.

Optionally, the information includes at least one of: the full MAC address of the selected electronic device, a master clock of the selected electronic device, or a device name associated with the selected electronic device.

Optionally, the method further comprises: if the connection attempt fails, updating the LAP record having the LAP value of the selected SAP value to include the candidate UAP value of the selected SAP value as a failed UAP value associated with the LAP value.

Optionally, each LAP record includes: a timestamp associated with the LAP value, and a counter value associated with the LAP value indicative of a number of times a packet containing the LAP value was received.

Optionally, for each LAP record, the LAP score is computed based on at least one of the following three criteria: i) the timestamp associated with the LAP value compared to the timestamps associated with the LAP values in all other LAP records, ii) the counter value associated with the LAP value, or iii) the timestamp associated with the LAP value compared with one or more provided time intervals.

Optionally, for each LAP record the LAP score is computed based on a weighted sum of all three criteria.

Optionally, each LAP record includes: i) a score for each candidate UAP value indicative of a likelihood that the candidate UAP value is associated with the LAP value, ii) an LAP clock tracking table including one or more candidate UAP values, a field for one or more of the candidate UAP values indicating that a connection attempt to the device using the one or more of the candidate UAP values failed in the past and a timestamp associated with the failed connection attempt.

Optionally, for each LAP record, the SAP score for each of the one or more candidate SAP values is computed based on at least one of the following four criteria: i) a score indicative of a likelihood that the candidate UAP value is associated with the LAP value, ii) whether the candidate UAP value is associated with a device from a pre-configured list of device manufacturers, iii) a timestamp associated with a previous failed attempt to connect to the device using the candidate UAP value, or iv) a number of occurrences of the candidate UAP value in an LAP clock tracking table.

Optionally, for each LAP record the SAP score for each of the one or more candidate SAP values is computed based on a weighted sum of all four criteria.

Optionally, each candidate UAP value is derived by: i) producing a candidate header of a received packet based on: the header of the received packet and a first linear feedback shift register initialized according to a candidate clock associated with the received packet, and ii) producing the candidate UAP value based on the candidate header and a second linear feedback shift register.

Optionally, updating the candidate UAP values in the LAP records includes: for each received packet, extracting an LAP value embedded in the received packet, checking the plurality LAP records to determine if the extracted LAP value is associated with one of the LAP records, and if the extracted LAP value is associated with one of the LAP records: updating the candidate UAP values in the one of the LAP records, and for each of the candidate UAP values in the one of the LAP records, computing a score indicative of a likelihood that the candidate UAP value is associated with the extracted LAP value.

Optionally, the method further comprises: if the extracted LAP value is not associated with any of the LAP records: initializing a list of candidate UAP values that might be associated with the extracted LAP value, and for each of the candidate UAP values in the initialized list, computing a score indicative of a likelihood that the candidate UAP value is associated with the extracted LAP value.

Optionally, each candidate UAP value is derived by: i) producing a candidate header of the received packet based on: the header of the received packet and a first linear feedback shift register initialized according to a candidate clock associated with the received packet, and ii) producing the candidate value UAP based on the candidate header and a second linear feedback shift register.

Embodiments of the present invention are directed to a method for determining a value of a significant address part (SAP) of a media access control (MAC) address of a device, the SAP having a lower address part (LAP) and an upper address part (UAP). The method comprises: retrieving one or more LAP records from a memory, each of the LAP records having: an LAP value associated with electronic device, and one or more candidate UAP values associated with the LAP value; computing for each LAP record: an LAP score associated with the LAP value, for each of the one or more candidate UAP values, a UAP score associated with the candidate UAP value, the candidate UAP value and the LAP value forming a candidate SAP value, and for each of the one or more candidate SAP values, an SAP score based on the LAP score and the UAP score; and attempting, by a probe device, to establish a connection to the device using a selected one of candidate SAP values based on the SAP scores.

Embodiments of the present invention are directed to a method. The method comprises: extracting, from a received packet transmitted by a device having a media access control (MAC) address including a lower address part (LAP) and an upper address part (UAP), an LAP value; checking a plurality of LAP records to determine if the extracted LAP value is associated with one of the LAP records, each of the LAP records associated with a different respective LAP value and having one or more candidate UAP values associated with the LAP value; and if the extracted LAP value is associated with one of the LAP records: updating the candidate UAP values in the one of the LAP records, and for each of the candidate UAP values in the one of the LAP records, computing a score indicative of a likelihood that the candidate UAP value is associated with the extracted LAP value.

Embodiments of the present invention are directed to a system for determining values of a lower address part (LAP) and an upper address part (UAP) of a media access control (MAC) address of one or more electronic devices. The system comprises: a memory for storing a plurality of LAP records, each of the LAP records including at least: i) an LAP value associated with an electronic device, and ii) one or more candidate UAP values associated with the LAP value; a probing manager associated with the memory and configured to: control a plurality of probing devices each configured to attempt to establish a connection to the one or more electronic devices using selected candidate LAP-UAP value pairs, each pair having a selected LAP value selected from one of the LAP records and a selected UAP value selected from the candidate UAP values associated with the selected LAP value, the selected candidate LAP-UAP pairs being selected based on one or more computed metrics associated with the candidate LAP-UAP value pairs; and a packet processor associated with the memory and configured to: process packets received from one or more electronic devices, and modify the LAP records by updating the candidate UAP values in the LAP records based on information derived from processing the packets received from the one or more electronic devices, the probing manager being further configured to: for each of one or more of the LAP records, modify the LAP record to include a determined UAP value, selected from the candidate UAP values, associated with the LAP value of the LAP record, in response to one of the probing devices successfully establishing a connection with the one or more electronic devices.

Embodiments of the present invention are directed to a system for determining values of a lower address part (LAP) and an upper address part (UAP) of a media access control (MAC) address of one or more electronic devices. The system comprises: a memory for storing LAP records, each of the LAP records having: an LAP value associated with an electronic device, and one or more candidate UAP values associated with the LAP value; and a probing manager associated with the memory and a plurality of probing devices each configured to attempt to establish a connection to the device using a candidate SAP value, the probing manager configured to: retrieve LAP records from the memory, compute for each of the retrieved LAP records: an LAP score associated with the LAP value, for each of the one or more candidate UAP values, a UAP score associated with the candidate UAP value, the candidate UAP value and the LAP value forming a candidate SAP value, and for each of the one or more candidate SAP values, an SAP score based on the LAP score and the UAP score, select one of the candidate SAP values as a selected SAP value based on the SAP scores, and provide a selected one of the candidate SAP values to an idle probing device of the plurality of probe devices.

Embodiments of the present invention are directed to a system. The system comprises: a packet processor for receiving packets from one or more devices, each of the devices having a media access control (MAC) address that includes a lower address part (LAP) and an upper address part (UAP); a memory coupled to the packet processor for storing LAP records, each of the LAP records having: an LAP value associated with a corresponding one of the one or more devices, and one or more candidate UAP values associated with the LAP value; for each received packet the packet processor being configured to: process the received packet to extract an LAP value from the received packet, check the memory to determine if the extracted LAP value is associated with one of the stored LAP records, and if the extracted LAP value is associated with one of the stored LAP records: update the candidate UAP values in the one of the stored LAP records, and for each of the candidate UAP values in the one of the stored LAP records, compute a score indicative of a likelihood that the candidate UAP value is associated with the extracted LAP value.

Throughout this document, numerous textual and/or graphical references are made to trademarks. These trademarks are the property of their respective owners, and are referenced only for explanation purposes herein.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings.

DESCRIPTION OF THE PREFERRED EMBODIMENTS

Figure 1:
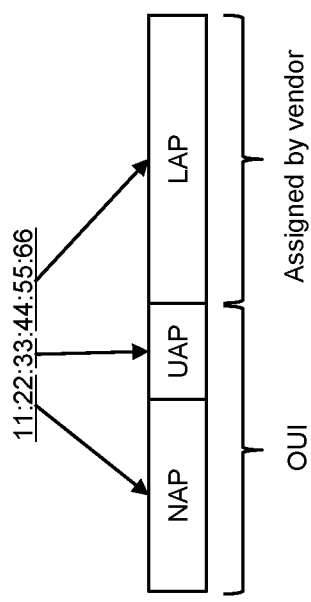
FIG. 1 is a diagram illustrating the structure of the MAC address of an electronic device operating according to the Bluetooth® Basic Rate (BT BR) or Bluetooth® Enhanced Data Rate (BT EDR) protocol standard.

The present invention is directed to computerized systems and methods for determining parts of the MAC address of BT devices, in particular Lower Address Part (LAP) and Upper Address Part (UAP) values of the MAC address.

The embodiments described herein are applicable to devices that operate according to either of the BT Basic Rate (BT BR) or BT Enhanced Data Rate (BT EDR) protocol standards.

Before explaining at least one embodiment of the invention in detail, it is to be understood that the invention is not necessarily limited in its application to the details of construction and the arrangement of the components and/or methods set forth in the following description and/or illustrated in the drawings and/or the examples. The invention is capable of other embodiments or of being practiced or carried out in various ways.

By way of introduction, each BT device is associated with a 6-byte (48 bit) MAC address. The MAC address is typically assigned to the device by the manufacturer of the device. The MAC address is also referred to as the Bluetooth Device Address (abbreviated as "BD_ADDR"). FIG. 1 illustrates the structure of the BD_ADDR, which is divided into an Organizationally Unique Identifier (OUI) and a Lower Address Part (LAP).

The OUI consists of the first 3 bytes (24 bits) of the MAC address. Each BT device manufacturer (i.e., vendor) uses an OUI prefix from a well-known set of prefixes that is assigned to the manufacturer by the Institute of Electrical and Electronics Engineers (IEEE). Accordingly, the OUI can be used to uniquely identify the manufacturer of a BT device.

The LAP consists of the last 3 bytes (24 bits) of the MAC address, and is typically assigned by the manufacturer of the BT device such that no two BT devices share the same MAC address.

The OUI is also subdivided into a Non-Significant Address Part (NAP) that consists of the first 2 bytes (16 bits) of the MAC address, and an Upper Address Part (UAP) that consists of the third byte of the MAC address.

The UAP and LAP (i.e., the last 4 bytes of the MAC address) together form what is referred to as the Significant Address Part (SAP) of the MAC address.

A BT device is also normally associated with a device name which can in some cases be customized by the end user.

The BT standard employs the Link Manager Protocol (LMP), which is used to establish connections between BT devices (commonly referred to as the "handshaking" process). The LMP is responsible for the establishment, authentication and configuration of the link over which other BT messages are exchanged. The LMP defines a set of Protocol Data Unit (PDU) messages. A first BT device can use certain LMP PDU messages in order to query a second BT device and receive information identifying the second BT device. More specifically, a BT device can transmit an LMP_name_req PDU message to a second BT device. The second BT device is then expected to respond with an LMP_name_res PDU message containing the name of the second BT device. The first BT device could use other LMP PDU messages in order to gather additional information about the second BT device.

Figure 2:
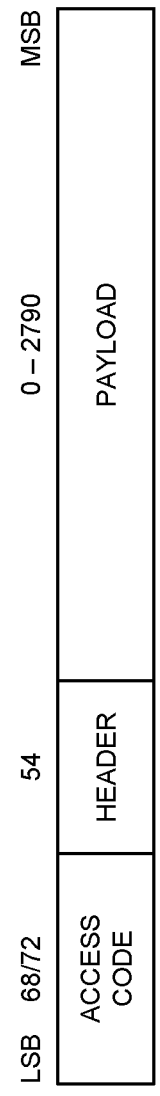
FIG. 2 is a diagram illustrating the structure of an exemplary BT BR packet, having an Access Code, a Header, and a Payload.

Referring now to FIG. 2, there is shown the general structure of a BT packet exchanged between BT devices that operate according to the BT BR protocol standard. A BT BR packet typically consists of the three parts, namely an ACCESS CODE (referred to interchangeably hereinafter as an "access code" or "Access Code"), followed by a HEADER (referred to interchangeably hereinafter as a "header" or "Header") and a PAYLOAD (referred to interchangeably hereinafter as a "payload" or "Payload"). BT EDR packets follow a similar format and typically also include an access code followed by a header and a payload. The access code consists of the first 68 or 72 bits of the BT packet, the header consists of the next 54 bits (typically a sequence of 18 bits that is repeated three times), and the payload consists of anywhere between 0 and 2790 bits (depending on various parameters including the packet type and frame format).

Figure 3:
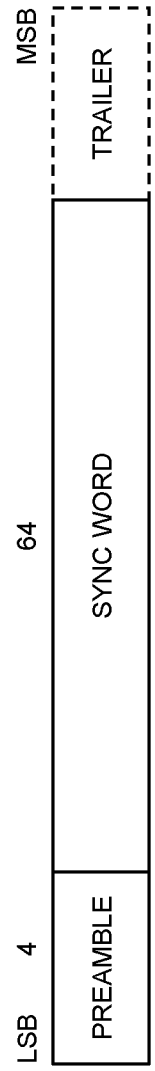
FIG. 3 is a diagram illustrating the structure of an exemplary Access Code of the BT BR packet of FIG. 2.

As illustrated in FIG. 3, the access code includes several fields, including a PREAMBLE (referred to interchangeably hereinafter as a "preamble" or a "Preamble") which consists of the first 4 bits of the access code, a SYNC WORD (referred to interchangeably hereinafter as a "sync word" or a "Sync Word") which consists of the next 64 bits of the access code after the preamble, and an optional TRAILER (referred to interchangeably hereinafter as a "trailer" or a "Trailer") which consists of the last 4 bits of the access code. The access code is used in order to find packets and to perform synchronization and error detection functions.

In many cases, the LAP of the master BT device is embedded in the sync word (i.e., the 64-bit sync word includes the 24-bit LAP), therefore the LAP of the master BT device can in most cases be easily be determined by sniffing BT packets, and identifying particular bits in the sync word. However, the UAP of the master BT device is typically not readily available from sniffed BT packets. The embodiments of the present invention provide special techniques for determining the UAP of the master BT device, which in combination with the determined LAP, provide the SAP of the BT device MAC address which can be used in order to connect to the BT master device.

Although the UAP is not readily available from sniffed BT packets, the UAP itself is used in order to generate error codes for packet error checking. Before discussing the method of error code generation, it is noted that as discussed above, BT devices use data whitening to scramble the header and payload of BT packets. Whitening is performed by applying a bitwise XOR on the BT header and payload using a sequence of bits. The sequence of bits is produced by a first LFSR whose initial state for each packet is derived from the 6 least significant bits of the clock of the master (CLK1-6).

Figure 4:
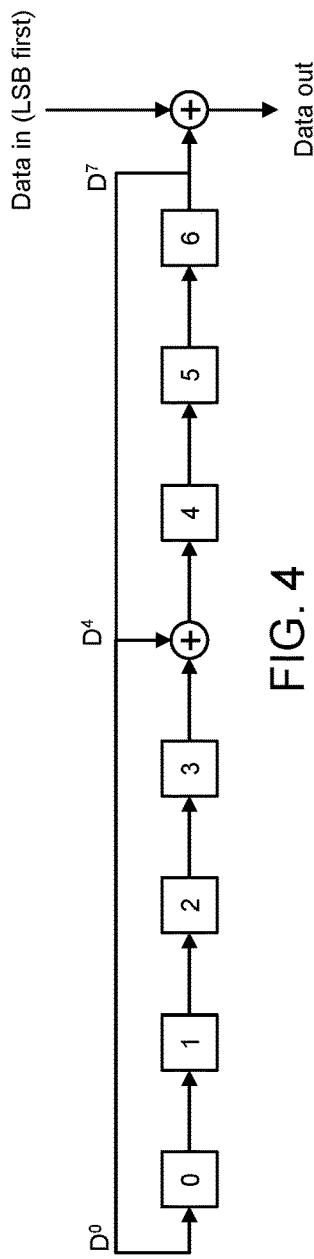
FIG. 4 is a diagram illustrating a first Linear Feedback Shift Register (LFSR) used for whitening the Header and Payload of a BT BR or BT EDR packet.

FIG. 4 illustrates a diagram of the first LFSR, showing the delay elements and the connections between the delay elements. The initial state of the first LFSR is illustrated in FIG. 5, which shows that the delay element in the zeroeth position is initialized to the bit value of CLK1, the delay element in the first position is initialized to the bit value of CLK2, the delay element in the second position is initialized to the bit value of CLK3, the delay element in the third position is initialized to the bit value of CLK4, the delay element in the fourth position is initialized to the bit value of CLK5, the delay element in the fifth position is initialized to the bit value of CLK6, and the delay element in the sixth position is initialized to the bit value of 1.

Figure 5:
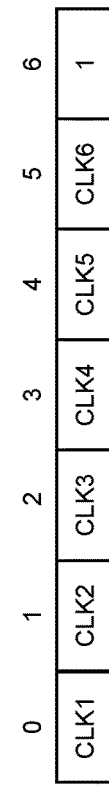
FIG. 5 illustrates the initial state of the LFSR of FIG. 4.

Un-whitening a packet is the reverse of whitening a packet, and can be accomplished by initializing the first LFSR with the same initial state illustrated in FIG. 5, and using the LFSR output to XOR the whitened packets so as to produce the un-whitened packet. Thus, it should be appreciated that in order to un-whiten a received whitened BT packet, the 6 least significant bits of the master clock (CLK1-6) need to be known. Alternatively, all 64 ($2^6$) initial states of the first LFSR can be tried in order to produce 64 candidate un-whitened packets.

Figure 6:
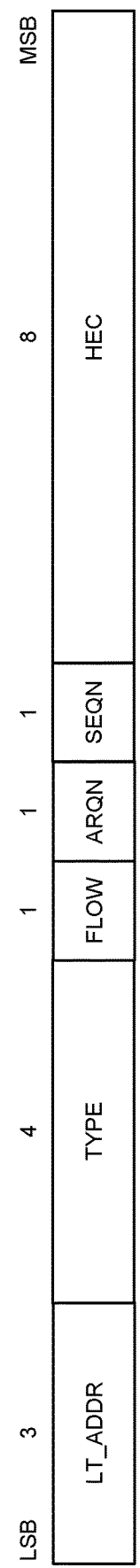
FIG. 6 is a diagram illustrating the structure of part of an exemplary Header of the BT BR packet of FIG. 2.
Figures 7, 8:
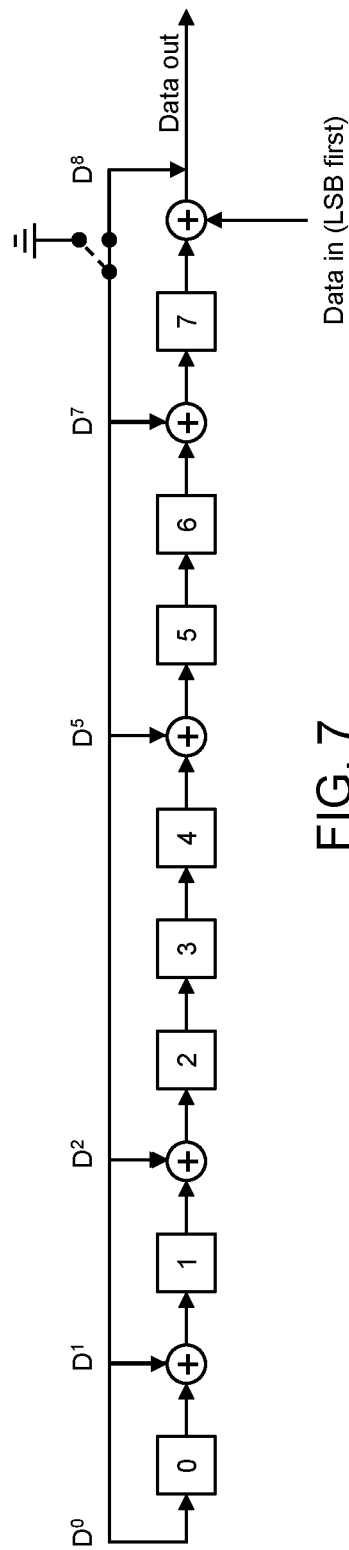
FIG. 7 is a diagram illustrating a second LFSR used for generating a Header Error Code (HEC) of the Header of FIG. 6.
FIG. 8 illustrates the initial state of the LFSR of FIG. 7, initialized using the Upper Address Part (UAP) of a BT master device.

As mentioned, the UAP of the master BT device is typically not readily available from sniffed BT packets. In fact, the UAP is typically only explicitly transmitted during the initial connection setup (i.e., handshaking procedure) between the master BT device and a slave BT device, which does not occur very often. However, as mentioned, the UAP is used in order to generate error codes for packet error checking. In particular, and with reference to FIGS. 6-8, the 8-bit UAP is used to generate an 8-bit Header Error Code (HEC) of the header (FIG. 6). Specifically, the header initially includes 10 bits that contain link control information. These 10 bits consist of a 3-bit Logical Transport Address (LT_ADDR) field, followed by a 4-bit TYPE ("type" or "Type") field, followed by a 1-bit FLOW control field, followed by a 1-bit ARQN field, followed by a 1-bit SEQN field). The 10 bits of the header are fed, one by one, into a second LFSR (FIG. 7) having eight delay elements that are initialized (as shown in FIG. 8) with the bit values of the UAP of the master BT device to produce the 8-bit HEC. After all of the 10 header bits have been fed into the second LFSR, the 8-bit value that is present in the delay elements of the second LFSR are read-out, and are used as the 8-bit HEC. The 8-bit HEC is appended to the initial 10-bit header to produce 18-bits, which are repeated three times to produce the 54-bit header (as shown in FIG. 2).

Given an un-whitened header, the UAP values of the master BT device can be computed. Thus, given a candidate CLK1-6 value and a BT packet with a whitened BT header, it is possible to un-whiten the packet to produce a candidate un-whitened header, and then reverse the second LFSR computation to compute a correspondingly associated candidate 8-bit UAP value.

It is noted that certain candidate CLK1-6 values may be filtered out by comparing the content of un-whitened portions of a packet to expected values. If the comparison results in the content having an unexpected value, the candidate CLK1-6 value that was used to un-whiten the packet can be ruled out. The filtering can be performed based on the content of a particular field of the header, in particular the 4-bit "type" field of the header. The bits in the "type" field of the header provide a code that indicates the type of BT packet. A preconfigured list of expected packet type values can be consulted when performing the comparison, whereby if the value of the packet type field in the un-whitened header is not found in the preconfigured list of expected packet type values, the corresponding candidate CLK1-6 value used to produce the un-whitened header is filtered out.

It is further noted that two or more BT packets may be correlated, for example based on the bit values in the LAP of the master BT device embedded in the sync word of the packets. If two or more packets share the same LAP value, it is likely (or at least reasonable to assume) that the packets belong to the same piconet. Given a set of two or more such correlated packets and the receipt timestamps of such packets, for each candidate CLK1-6 value associated with a first of the packets it should be possible to use the timestamps to compute candidate CLK1-6 values associated with all of the other packets in the set of correlated packets. For each of the other packets in the set of correlated packets, each computed candidate CLK1-6 values can be used to produce a corresponding candidate un-whitened packet and to compute an associated candidate UAP value.

For example, consider that two such correlated BT packets were received, where the second packet was received K clock ticks after the first packet. For each of the 64 candidate CLK1-6 values associated with the first packet, a corresponding candidate CLK1-6 value associated with the second packet could be computed such that if the candidate CLK1-6 value for the first packet is M, the associated computed candidate CLK1-6 value for the second packet would be M+K modulo 64. For example, if the second packet was received 4 clock ticks after the first packet (i.e., K=4), if the candidate CLK1-6 value for the first packet is 0 (i.e., M=0), the associated computed candidate CLK1-6 value for the second packet would be 4. Similarly, if the candidate CLK1-6 value associated with the first packet is 62 (i.e., M=62), the associated computed candidate CLK1-6 value for the second packet would be 2 (4+62 modulo 64=2).

Thus, using the above-described method, certain embodiments of the present disclosure maintain a clock tracking table that includes 64 rows representing the 64 possible CLK1-6 values for a first received packet with a specific LAP value and include a column for representing the UAP values computed for each correlated packet taking into account the number of clock ticks that have passed between receipt of the correlated packet and the first packet. The column would include a candidate UAP value for each of the 64 candidate CLK1-6 values.

The following example illustrates such a clock tracking table. In this example, two packets were received with the same LAP value. The second packet (Packet 2) was received 4 clock ticks after the first packet (Packet 1), i.e., K=4. For illustration purposes, this table includes an extra column related to the computed candidate CLK1-6 of the second packet.

| Packet 1 | | Packet 2 (4 clock ticks offset) | |
|---|---|---|---|
| candidate CLK1-6 | candidate UAP | candidate CLK1-6 | candidate UAP |
| 0 | 0x1D | 4 | 0x25 |
| 1 | 0x33 | 5 | 0x55 |
| . . . | | . . . | |
| 62 | 0x24 | 2 | 0x24 |
| 63 | 0x65 | 3 | 0xF5 |

As can be seen from the example clock tracking table, when the candidate CLK1-6 value for the first packet is 0, the resulting candidate UAP values for the first and second packet do not match (0x1D and 0x25, respectively). This is likely due to the fact that the correct CLK1-6 value associated with the first packet is not 0. However, when the candidate CLK1-6 value for the first packet is 62, the resulting candidate UAP values for the first and second packet do match (0x24 for both). This is likely due to the fact that the correct CLK1-6 value associated with the first packet is 62. In this example, it can be deduced or inferred that the UAP value is more likely to be 0x24 and less likely to be 0x1D or 0x25. However, it is noted that such deduction or inference is optimal (or near optimal) when packets are received without errors and the clocks of the senders and receivers are well synchronized and do not drift. The table above could be easily extended to support more than two packets by adding columns to the table every time a correlated packet is received. More specifically, every time a packet is received, the packet could be correlated using the LAP value in the received packet access code and an appropriate column (or sub-table) associated with the LAP value could be looked up. The clock ticks offset between the receipt of the current packet to the first packet could be computed and this offset value could be used to compute a respective candidate CLK1-6 value associated with the currently processed packet. For each such computed candidate CLK1-6 value the associated candidate UAP value can then be computed and added to the table.

Figure 9:
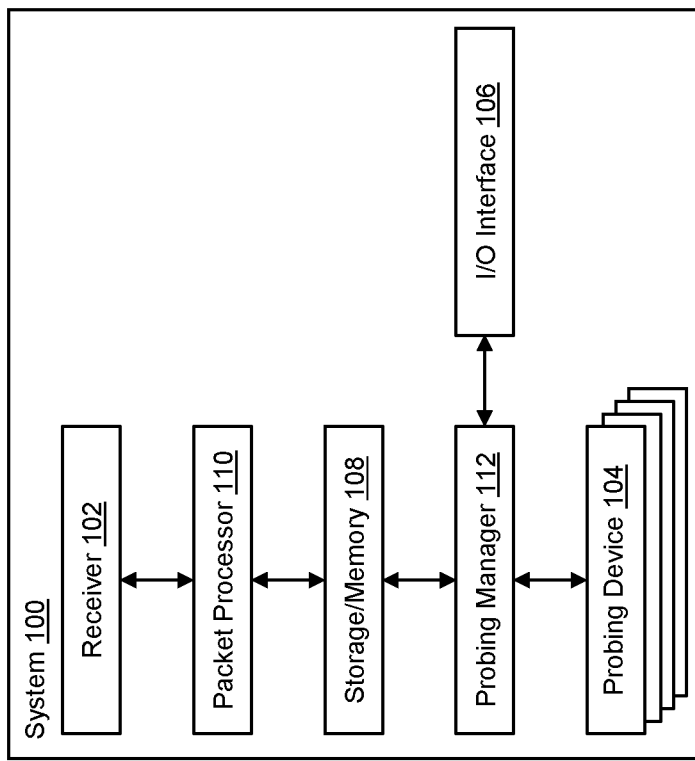
FIG. 9 is a diagram of the architecture of an exemplary system for determining Lower Address Part (LAP) and Upper Address Part (UAP) values of the MAC address of BT devices, according to embodiments of the present disclosure.

Bearing all of the above in mind, reference is now made to FIG. 9, which illustrates a block diagram of a system, generally designated 100, according to embodiments of the present disclosure. Generally speaking, the system 100 includes a radio receiver 102, at least one probing device 104, an input/output (I/O) interface 106, a storage/memory 108, a packet processor 110, and a probing manager 112. All components of the system 100 are connected or linked to each other (electronically and/or data), either directly or indirectly.

The radio receiver 102, referred to hereinafter as "receiver", is configured to receive BT packets transmitted by BT devices, preferably BT master devices. In certain embodiments, the receiver 102 operates as a "sniffer" that is configured to capture BT packets transmitted by BT master devices. Preferably, the receiver 102 is operative to tune to one, some, or all of the frequency channels used by the BT standard. Although not illustrated in the drawings, the receiver 102 includes various components commonly found in BT receivers, including, for example, one or more antenna for receiving radio signals across a frequency band supported by the BT standard, one or more pre-select filter in signal communication with the one or more antenna that is/are configured to be tuned so as to select signals in one of the frequency channels, a low-noise amplifier (LNA) in signal communication with the one or more pre-select filter that increases the signal strength in the selected frequency channel and to prevent noise in subsequent stages from contributing materially to signal sensitivity, in-phase (I) and quadrature (Q) mixers in signal communication with the LNA and a local oscillator (LO) for recovering the I and Q components of the signal in the selected frequency channel, and additional filters for filtering the I and Q signal components, as well as demodulator circuitry (e.g., GFSK demodulators) for demodulating the signals, and analog-to-digital converters (ADC) for digitizing the demodulated output signals.

It is noted that in certain embodiments the various receiver components are directly connected to the one or more antenna, and in other embodiments the receiver components are remotely connected to the one or more antenna. In such remote connections embodiments, the radio signals received by the one or more antenna are provided to the remaining receiver components via one or more radio relays.

In certain preferred embodiments, the receiver 102 is implemented as a Software Defined Radio (SDR), based on, for example the well-known Ubertooth open-source project.

The receiver 102 is preferably configured to provide the received packets to other components of the system 100, including, for example, the packet processor 110, along with additional information and/or metadata associated with the received packets. The information/metadata preferably includes timestamp values indicative of the time at which the packet was received by the receiver 102, as well as communication parameters associated with the packet, such as the frequency channel in which the packet was transmitted and received.

The at least one probing device 104 preferably includes a plurality of probing devices 104. In certain preferred but non-limiting implementations, each of the probing devices 104 is based on commercially available components, preferably commercial off-the-shelf (COTS) equipment, such as commonly available BT dongles that include BT transceivers coupled to a computer interface such as a Universal Serial Bus (USB) interface that can removably interface with the system 100. As will be discussed, each probing device 104 is configured to attempt to connect to a BT device using a provided LAP value and a corresponding candidate UAP value. If the LAP value and candidate UAP value match the LAP and UAP values in the MAC address of the BT device, the connection attempt is successful. The probing device 104 can then interrogate the connected BT device, for example by sending an LMP_name_req PDU message to the BT device, in order to collect information associated with the BT device, including, for example, the full MAC address of the BT device, the clock state of the BT device, and the device name. If, on the other hand, the LAP value and candidate UAP value do not match the LAP and UAP values in the MAC address of the BT device, the connection attempt typically times out and the connection is deemed unsuccessful.

The I/O interface 106 (also referred to simply as "the interface") can be implemented in various ways, including, for example, as a graphical user interface (GUI), a command line interface, an application programming interface (API), or any combination thereof. The interface 106 allows a user or operator of the system 100 to provide one or more input parameters to the system 100, and may also provide an interface for outputting information. The one or more input parameters may include, for example, 1) a list of one or more BT device manufacturers for which determination of the MAC addresses of devices produced by such manufacturers should be prioritized over determination of MAC addresses of devices produced by other manufacturers, and 2) a list of one or more time windows or time intervals for which determination of the MAC addresses of BT devices found to be communicating during such time windows or intervals should be prioritized over determination of MAC addresses of devices not found to be communicating during such time windows or intervals.

The parameters that are input to the system 100 via the interface 106 are preferably stored in the storage/memory 108.

The storage/memory 108 is any conventional storage media, which although shown as a single component for representative purposes, may be multiple components. At least one of the components of the storage/memory 108 is preferably configured to store data associated with the other components of the system 100, such as the parameters received from the interface 106. Furthermore, at least one of the components of the storage/memory 108 is preferably configured to store data records associated with LAP values in packets received by the receiver 102. In a preferred but non-limiting implementation, this at least one component of the storage/memory 108 is implemented as a database. At least one of the components of the storage/memory 108 may be configured to store machine executable instructions, associated with the operation of the components of the system 100, including, for example, the receiver 102, packet processor 110, and the probing manager 112.

Figure 10:
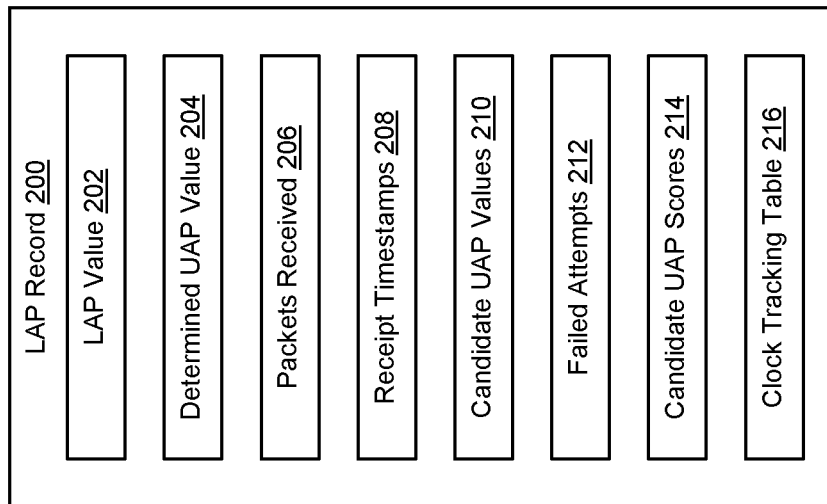
FIG. 10 is a non-limiting example of the data fields of an LAP data record stored in a memory of the system of FIG. 9, and modified/updated by a packet processor and probing manager of the system of FIG. 9.

With continued reference to FIG. 9, refer now to FIG. 10, an illustrative example of an LAP record 200 representative of one of the data records associated with LAP values in packets received by the receiver 102 that is stored in a database (maintained by the storage/memory 108). The LAP record 200 includes multiple data entries (or data fields or attributes) that store various values as data objects. In the non-limiting illustrative example, eight such data fields/attributes are maintained in the LAP record 200, and are represented as entries 202-216.

The first data entry 202, represented in FIG. 10 as LAP Value 202, contains the LAP value associated with the access code of a received packet. In general, no two LAP records are associated with the same LAP value. In other words, every received packet having the same particular LAP value is associated with the same LAP record. The LAP value in the LAP record can be used as a key to the database.

The second data entry 204, represented in FIG. 10 as Determined UAP Value 204, is an attribute that is optional upon initialization of the LAP record 200. This attribute is, however, updated during operation of the system 100 (as will be discussed in further detail below), and indicates the determined value of the UAP associated with the LAP value in entry 202.

The third data entry 206, represented in FIG. 10 as Packets Received 206, is indicative of the number of packets that were received having the LAP value in entry 202. In practice, the Packets Received 206 entry is a counter that is incremented each time a packet is received having the LAP value in entry 202.

The fourth data entry 208, represented in FIG. 10 as Receipt Timestamps 208, is an attribute that maintains a list of timestamps representing the times at which the packets associated with the LAP value in entry 202 were received (by the receiver 102).

The fifth data entry 210, represented in FIG. 10 as Candidate UAP Values 210, is a list of possible (i.e., potential) UAP values that might be associated with the LAP value in entry 202. Each of the UAP values in entry 210 is preferably associated with a score or metric that indicates the likelihood that the UAP value is associated with the LAP value in entry 202. In certain embodiments, a high score/metric indicates a high likelihood that the UAP value is associated with the LAP value.

The sixth data entry 212, represented in FIG. 10 as Failed Attempts 212, is a list of tuples, each tuple having a UAP value and a timestamp. Each tuple represents a failed connection attempt (i.e., unsuccessful connection) by one of the probing devices 104 to connect with a BT device using the LAP value in entry 202 and the UAP value of the tuple, as well as the timestamp that represents the time at which the connection attempt was unsuccessful (e.g., when the connection attempt timed out).

The seventh data entry 214, represented in FIG. 10 as Candidate UAP Scores 214, are the scores/metrics that indicate the likelihood that each of the respective candidate UAP values in entry 210 is associated with the LAP value in entry 202.

The eighth data entry 216, represented in FIG. 10 as Clock Tracking Table 216, is a clock tracking table such as the clock tracking table discussed above, that can be updated for each BT packet that is received by the receiver 102.

The LAP records, stored in the storage/memory 108, are modified during operation of the system 100. The modification is performed by the packet processor 110 in response to the receipt of packets by the receiver 102, as well as by the probing manager 112 in response to successful and failed connection attempts by the probing devices 104.

The packet processor 110 is formed of one or more processors, including microprocessors which are, for example, conventional processors, such as those used in servers, computers, and other computerized devices. For example, the processors may include x86 Processors from AMD and Intel, Xeon® and Pentium® processors from Intel, as well as any combinations thereof.

In certain preferred embodiments, the packet processor 110 receives BT packets, such as the packets captured by the receiver 102, as well as the information/metadata associated with the received packets. For each received packet, the packet processor 110 processes the received packet to check if an LAP value is present in the packet. The packet processor 110 may process the packet by scanning the packet to determine whether the packet has an access code, and then scanning the segment of the access code that typically contains the bits corresponding to the LAP value (i.e., checking a particular 24-bit segment of the access code). If no LAP value is present in the packet, the packet processor 110 does not perform further processing on the packet. If, however, an LAP value is present in the packet (i.e., an LAP value is represented in the 24-bit segment of the access code), the packet processor 110 processes the packet to extract the 24-bit LAP value.

The packet processor 110 then checks the LAP records in the database (storage/memory 108) to determine whether the extracted 24-bit LAP value is associated with one of the LAP records. The packet processor 110 may scan the LAP Value 202 in each of the LAP records to check for a match between the extracted LAP value and the LAP Value 202. If a match is not found, that means that no LAP record for the extracted LAP value exists in the database, and the packet processor 110 then initializes a new data record for the extracted LAP value.

The initialization of a new data record includes initializing an LAP record as follows: initializing the LAP Value 202 of the LAP record with the extracted LAP value, initializing the Determined UAP Value 204 as undefined or not set, initializing the Packets Received 206 to 1 (since this is the first received packet having the extracted LAP value), initializing the Receipt Timestamps 208 as a list having a single timestamp entry representative of the timestamp of the receipt of the current packet, initializing the Failed Attempts 212 as undefined or not set (since no connection attempts using the LAP value have yet to be made by the probing devices 104).

In addition to the above initializations, the packet processor 110 also initializes the Candidate UAP Values 210 with a list of candidate UAP values. In preferred embodiments, the packet processor 210 initializes the list candidate UAP values by iterating over all 64 possible candidate CLK1-6 values (as discussed above). For each candidate CLK1-6 value, the packet processor 110 uses the candidate CLK1-6 value to un-whiten the received (current) packet (using the first LFSR, e.g., FIG. 4), and then uses the HEC value (8-bit value) in the un-whitened header to compute the corresponding candidate UAP value (using the second LFSR, e.g., FIG. 7). Each candidate UAP value is added to the list in Candidate UAP Values 210 (unless a candidate UAP value is present in Failed Attempts 212).

For each candidate UAP value, the score or metric that indicates the likelihood that the candidate UAP value is associated with the extracted LAP value, can be computed by the packet processor 110 and added to Candidate UAP Scores 214. The score/metric computation performed by the packet processor 110 is based on a statistical analysis of the packet type. That statistical analysis will now be described in detail.

Let the variable T be defined to represent a preconfigured set of one or more packet types (provided by the 4-bit code in the "type" field of the header). For a given set of LAP and UAP value combinations (i.e., LAP-UAP value pairs), the random variable X is defined as representing the number of packets from a collection of N packets having a packet type found in T. The random variable X can generally be assumed to have a binomial distribution (N, P), where P is the probability that a single packet will have a packet "type" found in T. The mean ($\mu$) and standard deviation ($\sigma$), of random variables having a binomial distribution are well-established, and are given as $\mu = NP$ and $\sigma = \sqrt{NP(1-P)}$. Using these first and second order statistics, the score or metric, represented as the variable S, that indicates the likelihood that a candidate UAP value is associated with an LAP value, can be computed by the packet processor 110 according to the following formula:

$$S = \frac{X - \mu}{\sigma} = \frac{X - NP}{\sqrt{NP(1-P)}}$$

Thus, in order to compute the score S for each LAP and UAP value combination, only N and X need to be tracked by the packet processor 110, where N is the number of times a candidate un-whitened packet had the UAP and LAP combination, and where X is the number of times that the candidate un-whitened packet had a packet type T.

If a candidate UAP value is indeed associated with an LAP value, it is expected that the value of S will be high, whereas if a candidate UAP value is not associated with an LAP value, it is expected that the value of S will be low. Thus, the higher the value of S, the greater the likelihood that the candidate UAP value is associated with the LAP value, and the lower the value of S, the lower the likelihood that the candidate UAP value is associated with the LAP value.

In addition to the above initializations, the packet processor 110 may also initialize or update the Clock Tracking Table 216 with the computed candidate UAP values from Candidate UAP Values 210.

In certain preferred embodiments, the packet processor 110, while compiling the list of candidate UAP values, can filter out certain candidate UAP values, as discussed above. For example, the packet processor 110 may check the associated candidate un-whitened packet for unexpected packet field values such as unexpected packet type values. The filtering can be performed by the packet processor 110 consulting one or more preconfigured lists of expected packet field values such as a preconfigured list of expected packet type values, and removing candidate UAP values that correspond to packet types that are not in the preconfigured list of expected packet types.

Once the packet processor 110 completes the initialization of the new LAP data record for the extracted LAP value, the packet processor 110 stores the new LAP record in the database (i.e., the storage/memory 108), using, for example, the extracted LAP value as a key for future lookups.

If, after scanning the LAP Value 202 in each of the LAP records, a match is found, that means that an LAP record for the extracted LAP value already exists in the database, and the packet processor 110 then performs further processing on that LAP data record. First, the packet processor 110 checks the LAP record to determine whether the Determined UAP Value 204 has a value, or whether the Determined UAP Value 204 is undefined or not set. If the Determined UAP Value 204 has a value, that means that there is already a UAP value that is associated with the extracted LAP value, and the packet processor 110 does not perform further processing on the packet.

If the Determined UAP Value 204 does not have a value, i.e., the Determined UAP Value 204 is undefined or not set, the packet processor 110 updates some or all of the entries 202-216 in the LAP record, as will now be described.

The value in the Packets Received 206 entry is incremented by 1. In addition, the list of timestamps in the Receipt Timestamps 208 entry is updated to include the timestamp of the receipt of the current packet.

The Candidate UAP Values 210 entry is also updated by iterating over all 64 possible candidate CLK1-6 values (as discussed above). For each candidate CLK1-6 value, the packet processor 110 uses the candidate CLK1-6 value to un-whiten the received (current) packet (using the first LFSR, e.g., FIG. 4), and then uses the 8-bit HEC value in the un-whitened header to compute the corresponding candidate UAP value (using the second LFSR, e.g., FIG. 7). The newly computed candidate UAP values are added to the list in Candidate UAP Values 210, preferably replacing (overwriting) the old candidate UAP values in Candidate UAP Values 210. Also, similar to as described above, the packet processor 110 may filter out candidate UAP values that correspond to un-whitened packets that contain unexpected packet field values (e.g., unexpected packet types).

For each computed candidate UAP value, the packet processor 110 may also compute an updated score S and add the updated score S to the Candidate UAP Scores 214, and may also update the Clock Tracking Table 216 with the newly computed candidate UAP values found in Candidate UAP Values 210.

Referring again to FIG. 9, the probing manager 112 is coupled to the probing devices 104 and the storage/memory 108. In certain embodiments, the probing manager 112 includes at least one computerized processor preferably coupled to a computer memory, and is implemented as a hardware module or software module, and includes software, software routines, code, code segments and the like, embodied, for example, in computer components, modules and the like. In other embodiments, the probing manager 112 performs actions when instructed by the packet processor 110 or another computerized processor of the system 100.

The probing manager 112 is configured to perform multiple functions, including to at least: i) select an LAP-UAP value pair from the LAP records in the storage/memory 108, and ii) select one of the probing devices 104 and to control/command the selected probing device 104 to attempt to connect to a BT device using the selected LAP-UAP value pair, as will be described in detail below.

In order to select probing device 104, the probing manager 112 is preferably also configured to monitor the status of each of the probing devices 104 in order to identify one or more probing devices 104 having an idle status. Once one of the probing devices 104 is idle, the probing manager 112 selects one of the idle probing devices 104 as the selected probing device 104.

Subsequent to the selection of the selected probing device 104, the probing manager 112 selects a candidate SAP value (i.e., an LAP-UAP value pair) from the LAP records stored in the storage/memory 108. In order to select the candidate SAP value, the probing manager 112 retrieves a set of one or more of the LAP records from the storage/memory 108. Preferably, the set of retrieved LAP records includes all of the LAP records for which the Determined UAP Value 204 does not have a value, i.e., the Determined UAP Value 204 is undefined or not set. The probing manager 112 then iterates over each LAP record in the set of retrieved LAP records to compute one or more LAP scores/metrics and one or more UAP scores/metrics.

Computation of the LAP scores/metrics will now be described. For each LAP record in the set of retrieved LAP records, the probing manager 112 computes an LAP score/metric associated with the LAP value in the LAP record. The LAP score/metric is computed based on at least one of the following three criteria that each produce an independent score: i) favoring recently encountered LAP values over earlier encountered LAP values—such a strategy can be assisted by comparing the values in the Receipt Timestamps 208 entry in the LAP record to the values in the Receipt Timestamps 208 entry of the other LAP records in the set of retrieved records, ii) favoring frequently encountered LAP values over infrequently encountered LAP values—such a strategy can be assisted by comparing the Packets Received 206 entry in the LAP record to the values in the Packets Received 206 entry of the other LAP records in the set of retrieved records, and iii) favoring LAP values encountered during a provided list of time windows/intervals. The time windows/intervals could, for example, be based on presumed activity performed by a device whose MAC address is sought to be determined. For example, a BT device is likely to send multiple packets around the time that the BT device is turned on (i.e., powered on). Accordingly, a time window/interval around the time a BT device was turned on could be provided (via the interface 106) such that the LAP values encountered during the provided time window/interval are favored over LAP values not encountered during the provided time window/interval. Such a strategy can be assisted by comparing the Receipt Timestamps 208 entry in the LAP record with one or more of the provided time windows/intervals.

The probing manager 112 is configured to compute an independent score for each of the above-mentioned three criteria. In preferred embodiments, the probing manager 112 computes the LAP score based on a combination of all three independent scores, most preferably using a weighted sum of the three independent scores.

Computation of the UAP scores/metrics for each LAP record will now be described. For each LAP record in the set of retrieved LAP records, the probing manager 112 computes a UAP score/metric for each candidate UAP value in the Candidate UAP Values 210 of the LAP record. For each such candidate UAP value, the UAP score/metric is computed based on at least one of the following four criteria that each produce an independent score: i) favoring candidate UAP values having relatively high S scores—such strategy can be assisted by comparing the S score of the candidate UAP value in the Candidate UAP Score 214 to the S scores of the other candidate UAP values, ii) favoring candidate UAP values associated with a preconfigured list of device manufacturers—such a strategy can be assisted by using the well-known sets of device manufacturer settings assigned to each manufacturer by the IEEE, where the list of device manufacturers can be provided via the interface 106, iii) favoring candidate UAP values that are frequent in at least one row of the Clock Tracking Table 216, and iv) disfavoring candidate UAP values that were part of LAP-UAP value pairs that were used in recent failed connections to BT devices—for example a recent connection attempt failure can provide a lower score compared to a less recent connection attempt failure. Such a strategy can be assisted by utilizing the Failed Attempts 212 entry of the LAP record. For example, if the candidate UAP value is present in one of the tuples in the Failed Attempts 212 entry, the timestamp in that tuple can be compared to the timestamps in the other tuples in Failed Attempts 212, and the score associated with the candidate UAP value can be lowered if the associated timestamp indicates a more recent failed connection attempt compared to the other tuples (and raised if the associated timestamp indicates a less recent failed attempt compared to the other tuples).

For each candidate UAP value, the probing manager 112 is configured to compute an independent score for each of the above-mentioned four criteria. In preferred embodiments, for each candidate UAP value the probing manager 112 computes the UAP score based on a combination of all four independent scores, most preferably using a weighted sum of the four independent scores.

It is noted that the term "favoring", as used herein, generally refers to the act of assigning a higher score. Similarly, the term "disfavoring", as used herein, generally refers to the act of assigning a lower score.

Each UAP score, in combination with the LAP score associated with the LAP record, is used by the probing manager 112 to compute an SAP score. Preferably, the probing manager 112 computes the SAP score using a weighted sum of the UAP score and the LAP score. As a result, a set of candidate SAP scores are computed by the probing manager, where each SAP score is based on a computed LAP score and a computed UAP score that was computed for a candidate UAP value in the LAP record for which the LAP score was computed. For example, consider a scenario in which there are two LAP records, namely a first LAP record and a second LAP record. The first LAP record has a first LAP value denoted as $LAP_1$, and has 25 candidate UAP values (i.e., the Candidate UAP Values 210 in the first LAP record has 25 entries) denoted as $UAP_{1,1}$, $UAP_{1,2}$, ..., $UAP_{1,25}$. Each LAP-UAP value pair, i.e., $(LAP_1, UAP_{1,1})$, $(LAP_1, UAP_{1,2})$, ..., $(LAP_1, UAP_{1,25})$, forms a potential candidate SAP value. The probing manager 112 computes a score for $LAP_1$ (denoted by $A_1$) and computes a score for each of the 25 candidate UAP values (denoted by $B_{1,1}$, $B_{1,2}$, ..., $B_{1,25}$) using the criteria described above. The probing manager 112 then computes 25 SAP scores, denoted $C_{1,1}, C_{1,2}, \ldots, C_{1,25}$, where $C_{1,1}$ is the SAP score for the $(LAP_1, UAP_{1,1})$ value pair and is a weighted sum of $A_1$ and $B_{1,1}$, $C_{1,2}$ is the SAP score for the $(LAP_1, UAP_{1,2})$ and is a weighted sum of $A_1$ and $B_{1,2}$, and so on.

The second LAP record has a second LAP value denoted as $LAP_2$, and has 20 candidate UAP values (i.e., the Candidate UAP Values 210 in the second LAP record has 20 entries) denoted as $UAP_{2,1}$, $UAP_{2,2}$, ..., $UAP_{2,20}$. Each LAP-UAP value pair, i.e., $(LAP_1, UAP_{1,1})$, $(LAP_1, UAP_{1,2})$, ..., $(LAP_1, UAP_{1,25})$, forms a potential candidate SAP value. The probing manager 112 computes a score for $LAP_2$ (denoted by $A_2$) and computes a score for each of the 20 candidate UAP values (denoted by $B_{2,1}, B_{2,2}, \ldots, B_{2,20}$) using the criteria described above. The probing manager 112 then computes 20 SAP, denoted $C_{2,1}, C_{2,2}, \ldots, C_{2,20}$, where $C_{2,1}$ is the SAP score for the $(LAP_2, UAP_{2,1})$ value pair and is a weighted sum of $A_2$ and $B_{2,1}$, $C_{2,2}$ is the SAP score for the $(LAP_2, UAP_{2,2})$ value pair and is a weighted sum of $A_2$ and $B_{2,2}$, and so on.

All of the weights used for calculating the above-mentioned weighted sums can be pre-computed, e.g., computed offline, using one or more well-known algorithms, such as, for example, linear regression or logistic regression. The computed weights can be stored in a memory associated with the system 100, such as a memory of the probing manager 112.

After computing the scores for each SAP value, the probing manager 112 selects one of the SAP values as a preferred (selected) candidate SAP value, based on the computed SAP scores. Preferably, the probing manager 112 selects the SAP value associated with the highest SAP score as the selected/preferred candidate SAP value. The probing manager 112 provides the selected candidate SAP value to the selected idle probe device 104. The probing manager 112 then controls/commands the selected probing device 104 to attempt to establish a connection with a BT device that potentially has the selected SAP value in its MAC address. If the probing device 104 successfully connects to the BT device, the probing manager 112 updates the Determined UAP Value 204 entry of the LAP record having the LAP value that is part of the selected SAP value with the UAP value in the selected SAP value. The probing manager 112 may then output the selected SAP value, for example via the interface 106, and control/command the probing device 104 to interrogate the connected BT device by sending an LMP_name_req PDU message to the BT device, in order to collect information associated with the BT device, including, for example, the full MAC address of the BT device, the clock state of the BT device, and the device name.

If the probing device 104 fails to connect to the BT device using the selected SAP value, the probing manager 112 updates the Failed Attempts 212 entry of the LAP record having the LAP value that is part of the selected SAP value with the UAP value in the selected SAP value and the timestamp of the connection attempt.

For example, if $C_{2,1}$ is the highest SAP score, the probing device 112 selects the SAP value formed from the ($LAP_2$, $UAP_{2,1}$) value pair. If the probing device 104 establishes the connection to a BT device using the SAP value formed from the ($LAP_2$, $UAP_{2,1}$) value pair, the probing manager 112 updates the second LAP record to include $UAP_{2,1}$ as the UAP value in the Determined UAP Value 204 entry. If the probing device 104 fails to connect to the BT device using the SAP value formed from the ($LAP_2$, $UAP_{2,1}$) value pair, the probing manager 112 updates the Failed Attempts 212 entry in the second LAP record to include a tuple having $UAP_{2,1}$ and the timestamp of the failed connection attempt.

Parenthetically, the above description assumes an implementation in which a high score is indicative of a high likelihood that the SAP value will result in a successful connection with the BT device. It is noted, however, that other implementations are possible in which low scores are indicative of a high likelihood that the SAP value will result in a successful connection with the BT device.

Figure 11:
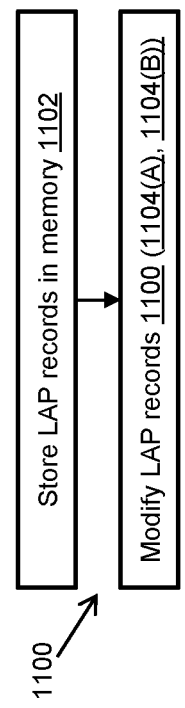
FIG. 11 is a flow diagram illustrating a process for determining LAP and UAP values of the MAC address of BT devices, according to embodiments of the present disclosure.

Attention is now directed to FIG. 11 which shows a flow diagram detailing a computer-implemented process 1100 in accordance with embodiments of the disclosed subject matter. This computer-implemented process includes an algorithm for, among other things, determining parts of the MAC address of BT devices. Reference is also made to the elements shown in FIGS. 1-10. Certain sub-processes of the process 1100 are illustrated in greater detail in the processes 1200 and 1300 of FIGS. 12 and 13, respectively. Theses process and sub-processes are computerized processes performed by various components of the system 100, including the receiver 102, the packet processor 110, the storage/memory 108, the probing manager 112, the probing devices 104, and the I/O interface 106. The aforementioned processes and sub-processes are for example, performed automatically, but can be, for example, performed manually, and are performed, for example, in real time.

Referring first to FIG. 11, at step 1102 of the process 1100, LAP records are stored in a component of storage/memory 108, for example in a database. As discussed, each of the LAP records includes multiple data entries, including at least an LAP value (e.g., entry 202) and one or more candidate UAP values (e.g., entry 210) associated with the LAP value.

At step 1104, the LAP records are modified. The sub-processes associated with the modification of the LAP records have been described above, and will be described again below with reference to FIGS. 12 and 13. Step 1104 includes two main sub-steps of modifying the LAP records. These two sub-steps are referred to as sub-step (A) and sub-step (B). At sub-step (A), the packet processor 110 modifies the LAP records by updating the candidate UAP values in the LAP records based on information associated with packets received (by the receiver 102) from one or more electronic devices. At sub-step (B), the probing manager 112 modifies each of the LAP records to include a determined UAP value selected from candidate UAP values associated with the LAP value of the LAP record, in response to (i.e., based on) attempts (by the probing devices 104) to connect to BT devices using selected candidate LAP-UAP value pairs, where each pair has the LAP value of the LAP record and a selected one of the candidate UAP values associated with the selected LAP value, and where the selected candidate LAP-UAP pairs are selected based on one or more computed scores/metrics associated with the candidate LAP-UAP value pairs.

Figure 12:
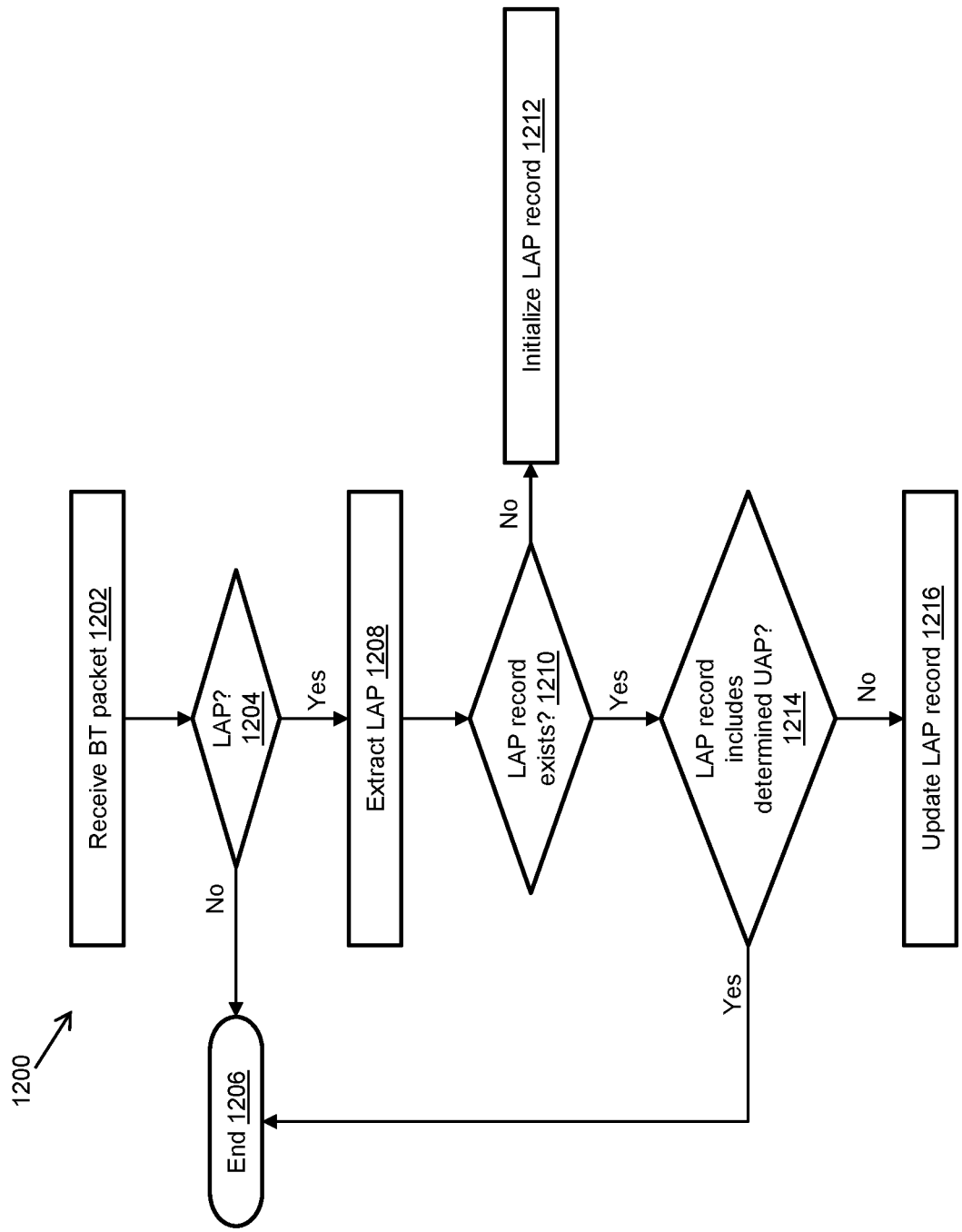
FIG. 12 is a flow diagram illustrating a sub-process of FIG. 11, according to embodiments of the present disclosure.

Turning now to FIG. 12, details of the sub-processes associated with sub-step (A) of step 1104 will now be described as the process 1200. At step 1202 of the process 1200, the receiver 102 receives a BT packet from a BT device and provides the packet to the packet processor 110. At step 1204, the packet processor 1204 checks the packet to determine whether the packet includes an LAP value. As discussed above, the packet processor 110 may process the packet by scanning the packet to determine whether the packet has an access code, and then scanning the segment of the access code that typically contains the bits corresponding to the LAP value.

If no LAP value is present in the packet, the process 1200 moves from step 1204 to step 1206 and ends, i.e., the packet processor 110 does not perform further processing on the packet.

If, however, an LAP value is present in the packet, the process 1200 moves from step 1204 to step 1208, where the packet processor 110 processes the packet to extract the LAP value.

The process 1200 then moves to step 1210, where the packet processor 110 retrieves the LAP records from the storage/memory 108 and sequentially or in parallel checks each of the retrieved LAP records to determine whether the LAP value extracted at step 1208 is associated with one of the LAP records. As discussed, the packet processor 110 may scan the LAP Value 202 entry in each of the LAP records to check for a match between the extracted LAP value and the LAP Value 202. In preferred embodiments, the packet processor 110 performs a database lookup using the extracted LAP value as a key to the database that stores the LAP records.

If a match is not found, the process 1200 moves from step 1210 to step 1212, where the packet processor 110 initializes a new data record for the extracted LAP value. The process of initializing a new LAP record was described in detail above and will not be repeated here.

If a match is found, the process 1200 moves from step 1210 to step 1214, where the packet processor 110 checks the LAP record to determine whether the LAP record includes a determined UAP, i.e., the packet processor 110 checks the LAP record to determine whether the Determined UAP Value 204 has a value, or whether the Determined UAP Value 204 is undefined or not set. If the Determined UAP Value 204 has a value, the process 1200 moves from step 1214 to step 1206 and ends, i.e., the packet processor 110 does not perform further processing on the packet.

If the Determined UAP Value 204 does not have a value, i.e., the Determined UAP Value 204 is undefined or not set, the process 1200 moves from step 1214 to step 1216, where the packet processor 110 updates the entries of the LAP record. The updating of the entries of the LAP record was described in detail above and will not be repeated here.

Figure 13:
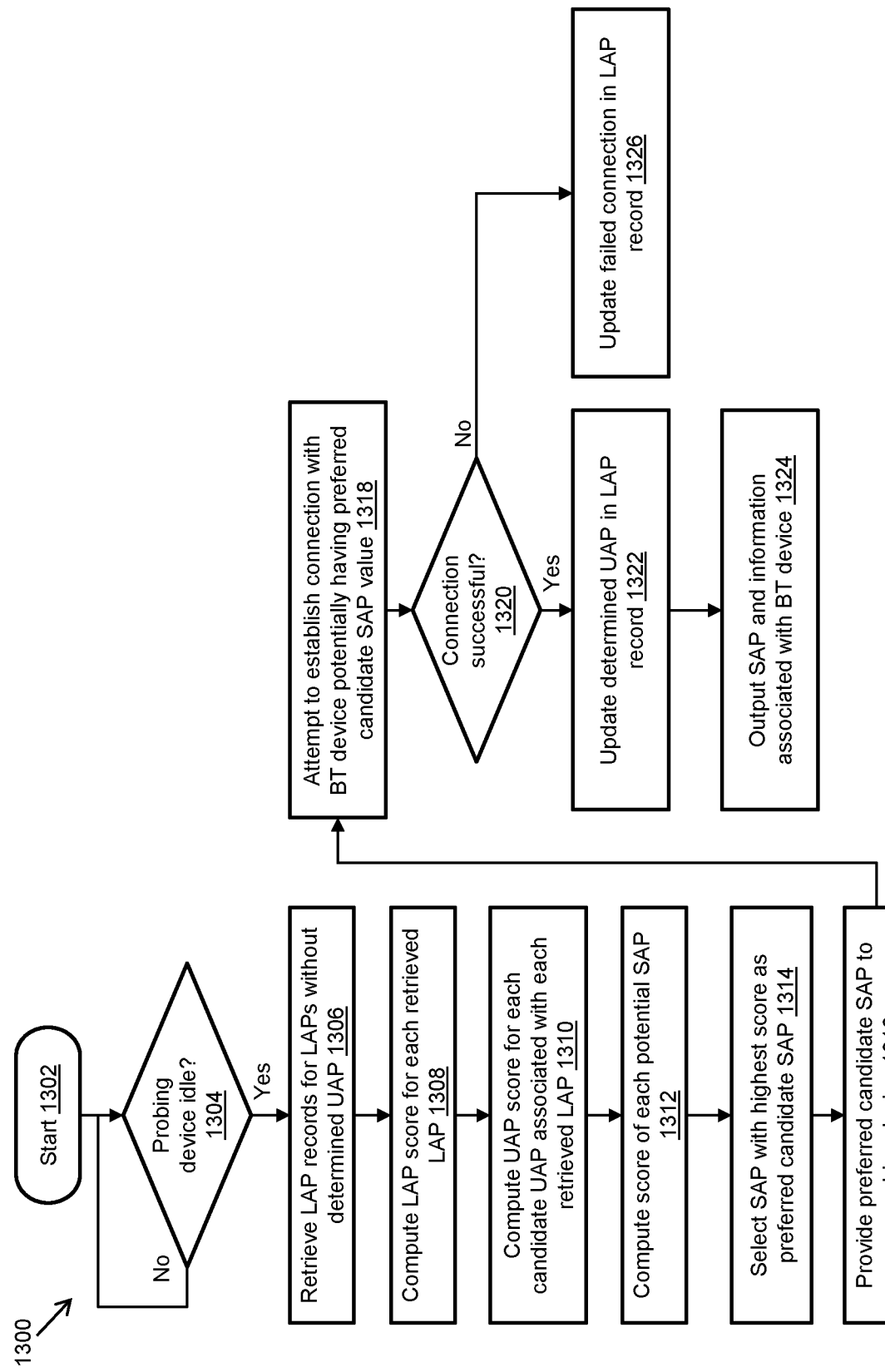
FIG. 13 is a flow diagram illustrating another sub-process of FIG. 11, according to embodiments of the present disclosure.

Turning now to FIG. 13, details of the sub-processes associated with sub-step (B) of step 1104 will now be described as the process 1300. At step 1302, the process 1300 starts. At step 1304, the probing manager 112 monitors the status of the probing devices 104 to identify one or more of the probing devices 104 having an idle status. The process 1300 loops and repeats step 1304 until one of the probing devices 104 is idle. Once one of the probing devices 104 is idle, the process 1300 moves to step 1306, where the probing manager 112 retrieves a set of one or more of the LAP records from the storage/memory 108. As discussed, preferably the set of retrieved LAP records includes all of the LAP records for which the Determined UAP Value 204 entry does not have a value, i.e., the Determined UAP Value 204 is undefined or not set.

The probing manager 112 then iterates over each LAP record in the set of retrieved LAP records to compute, for each LAP record: an LAP score (step 1308) and UAP scores for each candidate UAP value of the LAP record (step 1310), as described in detail above.

At step 1312, the probing manager 112 computes an SAP score for each SAP value (i.e., for each LAP-UAP value pair). The detailed steps for computing the SAP scores was described in detail above and will not be repeated here.

At step 1314, the probing manager 112 selects one of the SAP values as a preferred (selected) candidate SAP value, based on the SAP scores computed at step 1312. In certain non-limiting implementations, the probing manager 112 selects the SAP value associated with the highest SAP score as the selected/preferred candidate SAP value.

The process 1300 then moves to step 1316, where the probing manager 112 provides the candidate SAP value to the selected idle probing device 104. At step 1318, the probing manager 112 controls/commands the selected idle probing device 104 to attempt to establish a connection with a BT device potentially having the preferred candidate SAP value.

The process 1300 then moves to the decision step 1320. If the connection to the BT device is successful (as represented by the decision step 1320), the process 1300 moves from step 1320 to step 1322, where the probing manager 112 updates the Determined UAP Value 204 entry of the LAP record having the LAP value that is part of the selected SAP value with the UAP value in the selected SAP value. The process 1300 may then moves to step 1324, where the probing manager 112 outputs the candidate SAP value that was successfully used to connect with the BT device, and may further control/command the probing device 104 to interrogate the connected BT device in order to collect and output (e.g., via the I/O interface 106) information associated with the BT device, including, for example, the full MAC address of the BT device, the clock state of the BT device, and the device name.

If the connection is not successful, the process 1300 moves from step 1320 to step 1326, where the probing manager 112 updates the Failed Attempts 212 entry of the LAP record having the LAP value that is part of the selected SAP value with the UAP value in the selected SAP value and the timestamp of the connection attempt.

It is noted that determination of a successful or unsuccessful connection can be made based on various indicators, for example the presence or absence of LMP messages received from the BT device by the probing device 104.

It is appreciated that the two processes 1200 and 1300 work in concert together in order to efficiently determine the relevant part of the MAC address of BT devices. It is also noted that in certain instances, it is possible to move from one step of the process 1200 to one or more steps of the process 1300 (and vice versa). By way of one non-limiting example, it is possible to move from step 1216 of the process 1200 to steps 1306-1314 of the process 1300. It is further noted that although the process 1300 has been described herein as performing status monitoring of the probing devices 104 and selection of an idle probing device 104 (at step 1304) prior to LAP record retrieval and SAP score computation (steps 1306-1314), the order of these steps may be reversed in certain embodiments. In other words, it should be appreciated that in certain embodiments the LAP record retrieval and SAP score computation (steps 1306-1314) may be performed prior to identification and selection of an idle probing device 104.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, non-transitory storage media such as a magnetic hard-disk and/or removable media, for storing instructions and/or data. Optionally, a network connection is provided as well. A display and/or a user input device such as a keyboard or mouse are optionally provided as well.

For example, any combination of one or more non-transitory computer readable (storage) medium(s) may be utilized in accordance with the above-listed embodiments of the present invention. The non-transitory computer readable (storage) medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

As will be understood with reference to the paragraphs and the referenced drawings, provided above, various embodiments of computer-implemented methods are provided herein, some of which can be performed by various embodiments of apparatuses and systems described herein and some of which can be performed according to instructions stored in non-transitory computer-readable storage media described herein. Still, some embodiments of computer-implemented methods provided herein can be performed by other apparatuses or systems and can be performed according to instructions stored in computer-readable storage media other than that described herein, as will become apparent to those having skill in the art with reference to the embodiments described herein. Any reference to systems and computer-readable storage media with respect to the following computer-implemented methods is provided for explanatory purposes, and is not intended to limit any of such systems and any of such non-transitory computer-readable storage media with regard to embodiments of computer-implemented methods described above. Likewise, any reference to the following computer-implemented methods with respect to systems and computer-readable storage media is provided for explanatory purposes, and is not intended to limit any of such computer-implemented methods disclosed herein.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the singular form "a", "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

The above-described processes including portions thereof can be performed by software, hardware and combinations thereof. These processes and portions thereof can be performed by computers, computer-type devices, workstations, processors, micro-processors, other electronic searching tools and memory and other non-transitory storage-type devices associated therewith. The processes and portions thereof can also be embodied in programmable non-transitory storage media, for example, compact discs (CDs) or other discs including magnetic, optical, etc., readable by a machine or the like, or other computer usable storage media, including magnetic, optical, or semiconductor storage, or other source of electronic signals.

The processes (methods) and systems, including components thereof, herein have been described with exemplary reference to specific hardware and software. The processes (methods) have been described as exemplary, whereby specific steps and their order can be omitted and/or changed by persons of ordinary skill in the art to reduce these embodiments to practice without undue experimentation. The processes (methods) and systems have been described in a manner sufficient to enable persons of ordinary skill in the art to readily adapt other hardware and software as may be needed to reduce any of the embodiments to practice without undue experimentation and using conventional techniques.

To the extent that the appended claims have been drafted without multiple dependencies, this has been done only to accommodate formal requirements in jurisdictions which do not allow such multiple dependencies. It should be noted that all possible combinations of features which would be implied by rendering the claims multiply dependent are explicitly envisaged and should be considered part of the invention.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A method for determining values of a lower address part (LAP) and an upper address part (UAP) of a six-byte media access control (MAC) address of one or more electronic devices, the method comprising:
   storing a plurality of LAP records in a memory, each of the LAP records including at least: i) an LAP value associated with an electronic device, wherein the LAP value is a three-byte value defined by the last three bytes of the MAC address of the electronic device, and ii) one or more candidate UAP values associated with the LAP value, wherein the one or more candidate UAP values are candidate byte values for the third byte of the MAC address of the electronic device; and
   modifying the LAP records by:
   i) updating the candidate UAP values in the LAP records based on information associated with packets received from one or more electronic devices, and ii) for each of one or more of the LAP records, updating the LAP record to include a determined UAP value selected from the candidate UAP values associated with the LAP value of the LAP record based on attempts to connect to an electronic device of the one or more electronic devices using selected candidate LAP-UAP value pairs, each pair having the LAP value of the LAP record and a selected one of the candidate UAP values associated with the selected LAP value, wherein the selected candidate LAP-UAP pairs are selected based on one or more computed metrics associated with the candidate LAP-UAP value pairs.

2. The method of claim 1, wherein updating the LAP record to include a determined UAP value includes:
retrieving one or more of the LAP records from the memory,
computing for each retrieved LAP record:
an LAP score associated with the LAP value in the LAP record,
for each of the one or more candidate UAP values in the LAP record, a UAP score associated with the candidate UAP value, wherein the candidate UAP value and the LAP value form a candidate significant address part (SAP) value that is a four-byte value defined by the last four bytes of the MAC address of the associated electronic device, and
for each of the one or more candidate SAP values, an SAP score based on the LAP score and the UAP score, and
attempting, by a probe device, to establish a connection to a selected electronic device of the one or more electronic devices using a selected one of candidate SAP values based on the SAP scores.

3. The method of claim 2, further comprising: if the connection is successfully established, updating the LAP record having the LAP value of the selected SAP value to include the candidate UAP value of the selected SAP value as a determined UAP value associated with the LAP value.

4. The method of claim 3, further comprising: by the probe device, interrogating the device to extract information associated with the selected electronic device.

5. The method of claim 4, wherein the information includes at least one of: the full MAC address of the selected electronic device, a master clock of the selected electronic device, or a device name associated with the selected electronic device.

6. The method of claim 2, further comprising: if the connection attempt fails, updating the LAP record having the LAP value of the selected SAP value to include the candidate UAP value of the selected SAP value as a failed UAP value associated with the LAP value.

7. The method of claim 2, wherein each LAP record includes: a timestamp associated with the LAP value, and a counter value associated with the LAP value indicative of a number of times a packet containing the LAP value was received.

8. The method of claim 7, wherein for each LAP record, the LAP score is computed based on at least one of the following three criteria: i) the timestamp associated with the LAP value compared to the timestamps associated with the LAP values in all other LAP records, ii) the counter value associated with the LAP value, or iii) the timestamp associated with the LAP value compared with one or more provided time intervals.

9. The method of claim 8, wherein for each LAP record the LAP score is computed based on a weighted sum of all three criteria.

10. The method of claim 2, wherein each LAP record includes: i) a score for each candidate UAP value indicative of a likelihood that the candidate UAP value is associated with the LAP value, ii) an LAP clock tracking table including one or more candidate UAP values, a field for one or more of the candidate UAP values indicating that a connection attempt to the device using the one or more of the candidate UAP values failed in the past and a timestamp associated with the failed connection attempt.

11. The method of claim 2, wherein for each LAP record, the SAP score for each of the one or more candidate SAP values is computed based on at least one of the following four criteria: i) a score indicative of a likelihood that the candidate UAP value is associated with the LAP value, ii) whether the candidate UAP value is associated with a device from a pre-configured list of device manufacturers, iii) a timestamp associated with a previous failed attempt to connect to the device using the candidate UAP value, or iv) a number of occurrences of the candidate UAP value in an LAP clock tracking table.

12. The method of claim 11, wherein for each LAP record the SAP score for each of the one or more candidate SAP values is computed based on a weighted sum of all four criteria.

13. The method of claim 2, wherein each candidate UAP value is derived by: i) producing a candidate header of a received packet based on: the header of the received packet and a first linear feedback shift register initialized according to a candidate clock associated with the received packet, and ii) producing the candidate UAP value based on the candidate header and a second linear feedback shift register.

14. The method of claim 1, wherein updating the candidate UAP values in the LAP records includes:
for each received packet, extracting an LAP value embedded in the received packet,
checking the plurality LAP records to determine if the extracted LAP value is associated with one of the LAP records, and
if the extracted LAP value is associated with one of the LAP records:
updating the candidate UAP values in the one of the LAP records, and
for each of the candidate UAP values in the one of the LAP records, computing a score indicative of a likelihood that the candidate UAP value is associated with the extracted LAP value.

15. The method of claim 14, further comprising:
if the extracted LAP value is not associated with any of the LAP records:
initializing a list of candidate UAP values that might be associated with the extracted LAP value, and
for each of the candidate UAP values in the initialized list, computing a score indicative of a likelihood that the candidate UAP value is associated with the extracted LAP value.

16. The method of claim 14, wherein each candidate UAP value is derived by: i) producing a candidate header of the received packet based on: the header of the received packet and a first linear feedback shift register initialized according to a candidate clock associated with the received packet, and ii) producing the candidate value UAP based on the candidate header and a second linear feedback shift register.

17. The method of claim 1, wherein for each of the LAP records, the electronic device associated with the LAP value operates according to a Bluetooth® protocol.

18. A method for determining a value of a significant address part (SAP) of a six-byte media access control (MAC) address of a device, the SAP corresponding to the last four bytes of the MAC address and having an upper address part (UAP) corresponding to the third byte of the MAC address and a lower address part (LAP) corresponding to the last three bytes of the MAC address, the method comprising:
- retrieving one or more LAP records from a memory, each of the LAP records having: an LAP value associated with an electronic device, and one or more candidate UAP values associated with the LAP value, wherein the LAP value is a three-byte value defined by the last three bytes of the MAC address of the associated electronic device, and wherein the one or more candidate UAP values are candidate byte values for the third byte of the MAC address of the associated electronic device;
- computing for each LAP record:
  - an LAP score associated with the LAP value,
  - for each of the one or more candidate UAP values, a UAP score associated with the candidate UAP value, wherein the candidate UAP value and the LAP value form a candidate SAP value that is a four-byte value defined by the last four bytes of the MAC address of the associated electronic device, and
  - for each of the one or more candidate SAP values, an SAP score based on the LAP score and the UAP score; and
- attempting, by a probe device, to establish a connection to the electronic device using a selected one of candidate SAP values based on the SAP scores.

19. The method of claim 18, wherein each of the device and the electronic device associated with the LAP value operates according to a Bluetooth® protocol.

20. A method comprising:
- extracting, from a received packet transmitted by a device having a six-byte media access control (MAC) address including an upper address part (UAP) corresponding to the third byte of the MAC address and a lower address part (LAP) corresponding to the last three bytes of the MAC address, an LAP value that is a three-byte value defined by the last three bytes of the MAC address of the device;
- checking a plurality of LAP records to determine if the extracted LAP value is associated with one of the LAP records, each of the LAP records associated with a different respective LAP value and having one or more candidate UAP values associated with the LAP value, wherein the one or more candidate UAP values are candidate byte values for the third byte of the MAC address of the device; and
- if the extracted LAP value is associated with one of the LAP records:
  - updating the candidate UAP values in the one of the LAP records, and
  - for each of the candidate UAP values in the one of the LAP records, computing a score indicative of a likelihood that the candidate UAP value is associated with the extracted LAP value.

21. The method of claim 20, wherein the device that transmitted the packet operates according to a Bluetooth® protocol.

* * * * *